United States Patent
Sogoian

(10) Patent No.: US 6,415,694 B1
(45) Date of Patent: Jul. 9, 2002

(54) METHOD AND CHUCK FOR PRECISION MACHINING OF THIN WALLED SLEEVES AND FOR MANUFACTURING ENGINE CYLINDER LINER SLEEVES

(76) Inventor: Kaloust P. Sogoian, 3019 E. Ridge Ct., Bloomfield, MI (US) 48302

( * ) Notice: Subject to any disclaimer, the term of this patent is extended or adjusted under 35 U.S.C. 154(b) by 0 days.

(21) Appl. No.: 09/590,959

(22) Filed: Jun. 9, 2000

(51) Int. Cl.[7] ................................. B23B 1/00
(52) U.S. Cl. ........................ 82/1.11; 82/47; 82/82; 82/113
(58) Field of Search ............... 82/1.11, 165, 164, 82/175, 143, 147, 113, 46, 47, 82

(56) References Cited

U.S. PATENT DOCUMENTS

| | | | | |
|---|---|---|---|---|
| 338,291 A | * | 3/1886 | O'Neil | 82/164 |
| 4,223,577 A | * | 9/1980 | Seppelt | 82/1.11 |
| 4,246,812 A | * | 1/1981 | Gladwin et al. | 82/1.11 |
| 4,402,136 A | * | 9/1983 | Rast | 82/113 X |
| 5,609,081 A | * | 3/1997 | Lin | 82/59 |
| 5,671,646 A | * | 9/1997 | Sandford et al. | 82/113 |
| 5,713,253 A | * | 2/1998 | Date et al. | 82/1.11 |

* cited by examiner

*Primary Examiner*—Henry Tsai
(74) *Attorney, Agent, or Firm*—Gifford, Krass, Groh, Sprinkle, Anderson & Citkowski, P.C.

(57) ABSTRACT

A method of manufacturing precision machined thin sleeves, as for engine cylinder liners in which the outside diameter of a thick walled tubular preform is first machined to a finish size, and the preform chucked in an encircling jaw chuck on the preform outside diameter. The inside diameter is machined to a finish size having a desired wall thickness. The encircling surfaces of the chuck jaws creates a slightly undersized circle to clamp the preform to a predetermined degree.

7 Claims, 2 Drawing Sheets

METHOD AND CHUCK FOR PRECISION MACHINING OF THIN WALLED SLEEVES AND FOR MANUFACTURING ENGINE CYLINDER LINER SLEEVES

BACKGROUND OF THE INVENTION

This invention concerns machining methods and more particularly methods for precision machining of thin walled cast iron sleeves.

Modern piston engine design has utilized heavy walled cast iron liner sleeves inserted into bores machined into an aluminum block. The cast iron sleeves provide wear resistance and proper sliding fit of the engine pistons within the cylinder bores.

However, the thinner the wall of the liner, the more weight that would be saved, and there also would be a heat transfer improvement if very thin walled liners were used.

Thus, it has been proposed to use cylinder liner sleeves as thin as 0.035 inches thick for optimal advantage.

However, the inside diameter of the liner must be precision machined to close tolerances, and it would be difficult and costly to properly machine very thin walled sleeves.

The conventional technique for machining involves finish machining the inside diameter of a tubular preform, chucking the preform on an expanding mandrel, and then finish machining the outside diameter. The expanding mandrel would inevitably distort a thin walled sleeve leading to an out of round or distorted condition of the liner sleeve.

It is the object of the present invention to provide an improved method for manufacturing engine cylinder liner sleeves and in particular for producing precision machined thin walled liner sleeves.

It is a further object to provide an improved chuck for use in the precision machining of thin walled tubes.

SUMMARY OF THE INVENTION

These objects and others which will be understood upon a reading of the following specification and claims are achieved by first finish machining the outside diameter of a tubular blank or preform. The outside diameter of the preform is then secured in a chuck having engagement surfaces which substantially completely encircle and engage the finish machined outside diameter of the preform to securely clamp the same.

Finish machining of the internal diameter is then carried out, with the encircling chuck engagement surfaces providing a sufficiently rigid support to enable very precise machining of the inside diameter even when only a very thin wall remains after the finish machining is completed. A thin walled precision engine cylinder liner sleeve is thereby produced.

The encircling chuck engagement surfaces comprise portions of a circle defined by each jaw of the chuck.

The chuck is preferably of a special two jaw design, each jaw formed with a semicircular engagement surface, one of the jaws driven by an actuator to be movable relative to the other jaw to completely encircle the outside diameter of the preform. The jaws have abutment surfaces which provide a positive stop, positively limiting further relative closing movement of the jaws, at which point the semicircular engagement surfaces form a circle of a diameter slightly undersized in comparison to the finished outside diameter of the preform.

That is, the two semicircular engagement surfaces define a continuous circle of a diameter slightly smaller than the finished outside diameter size of the preform, for example 0.0002 inches smaller than the finished outside diameter of the preform. This compresses the preform to the degree necessary so as to be securely held during the finish machining of the internal diameter, without causing deformation of the sleeve even when most of the wall thickness is machined away to leave only a very thin wall.

DESCRIPTION OF THE DRAWING FIGURES

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
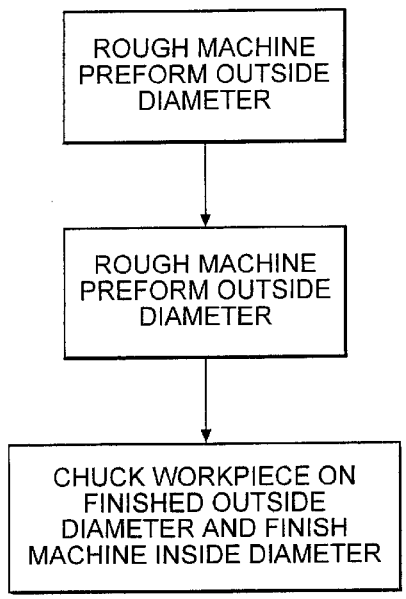
FIG. 1 is a block diagram flow chart depicting the method according to the present invention.

FIG. 1 sets out the basic steps of the method according to the invention.

Cast iron tubular preforms cut to length are manufactured by conventional techniques with the outside diameter rough machined also by a conventional method, as for example by turning, centerless grinding, etc. It will be understood that other features such as grooves, or the like, are often machined into the OD of the sleeve, and the machining of these features would be done at this time. The outside diameter is then finish machined, typically by being ground, to its finished size.

The finish machined preform is then chucked in a special two jaw chuck, configured to substantially completely encircle and slightly compress the outside diameter of the preform, as described below. The inside diameter is then machined to its final finished diameter, leaving a thin wall. By completely supporting the preform with chuck engagement surfaces, the finish bore can be machined to extremely close tolerances despite the thinness of the sleeve.

Figure 2:
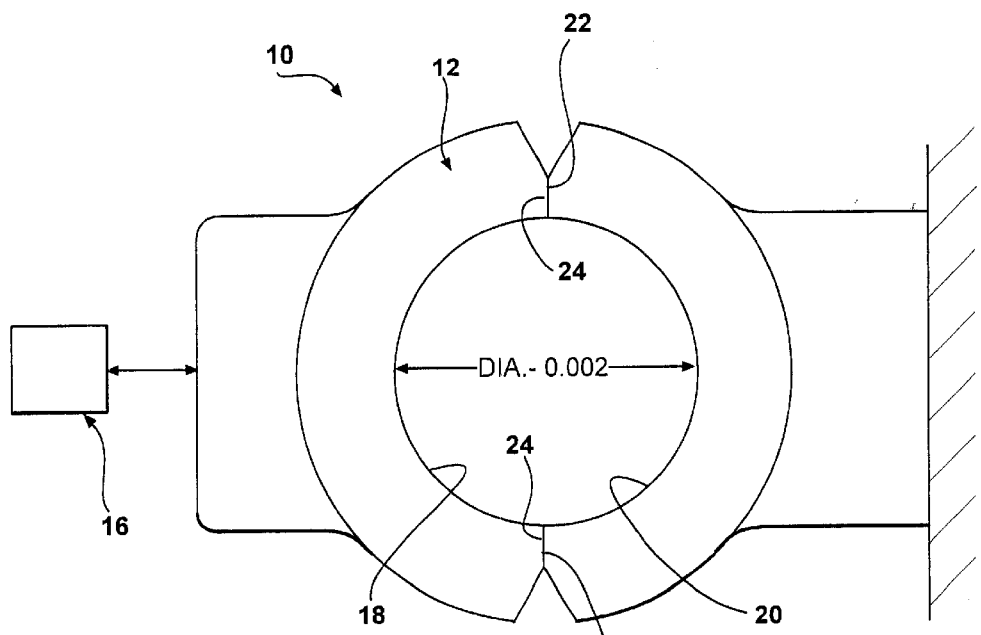
FIG. 2 is an end view of a two jaw chuck used in the practice of the present invention.

FIG. 2 shows the special two jawed chuck 10 used to practice the invention.

A movable jaw 12 and stationary jaw 14 are shown in their closed position.

The moveable jaw 12 may be moved relative to the fixed jaw 14 by means of a hydraulic actuator 16, depicted diagrammatically.

Each jaw 12, 14 has a semicircular engagement surface 18, 20 together forming a complete circle when the jaws 12, 14 are brought into positive engagement with each other. Respective abutment surfaces 22, 24 positively limit the jaw travel to the position whereat the circle is formed by surfaces 18, 20.

The diameter of the circle so formed is set to be slightly less than the finished outside diameter size of the preform, i.e., 0.0002 inches smaller in diameter as indicated. This consistently creates a predetermined limited compression of the preform sufficient to securely hold the same in the chuck 10 without excessive distortion.

The surfaces 22, 24 may be advantageously be machined as by grinding.

Figure 3:
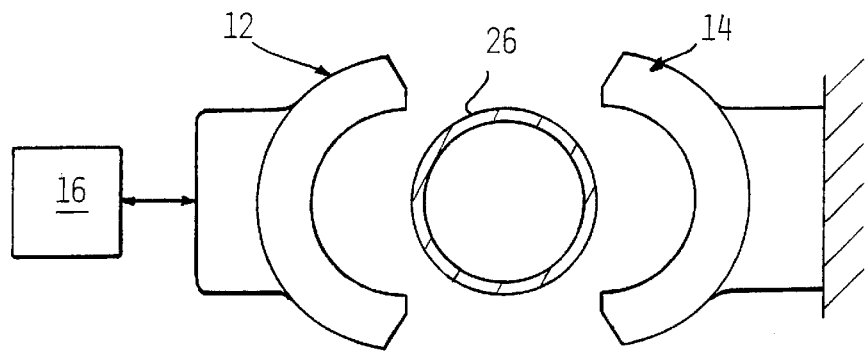
FIG. 3 is an end view of the chuck shown in FIG. 2 with the movable jaw retracted to allow a preform also shown to be placed therein.

The movable jaw 12 is retracted by the actuator 16 as shown in FIG. 3 to allow the tubular preform 26 to be placed between the jaws 12, 14.

Figure 4:
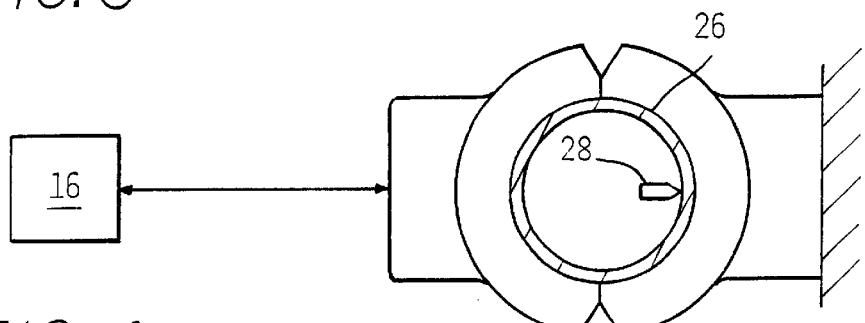
FIG. 4 is an end view of the chuck and a sectional view of the preform, the movable jaw of the chuck advanced to compress and grip the preform, FIG. 4 also showing a tooling piece machining the inside diameter of the preform.

FIG. 4 shows the jaws 12, 14 closed together to bring the surfaces 22, 24 into abutment, positively stopping any further relative closing movement of the jaws 12, 14. At this point, the engagement surfaces 18, 20 slightly compress the outside diameter of the preform 26 to create a predetermined gripping force.

The use of the fixed or stationary jaw 14 insures that the centerline of the tooling and the tubular preform 26 are consistently aligned.

FIG. 4 depicts a tooling piece 28 machining the internal diameter of the chucked preform 26.

Figure 5:
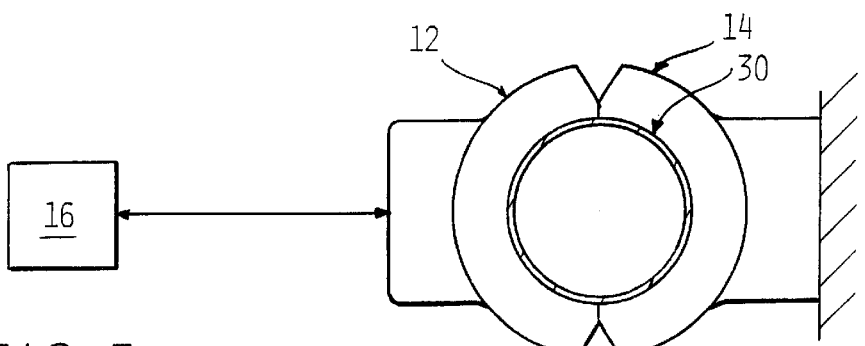
FIG. 5 is an end view of the chuck and preform as shown in FIG. 4 with the inside diameter machined to its finished size, the wall thickness exaggerated for the sake of clarity.

Rough and finish machining steps may be carried out as by conventional turning or grinding apparatus, allowing a reduction in the wall thickness to a very thin wall thickness, i.e., down to a few thousandths of an inch while having an extremely accurately machined inside diameter, as indicated in FIG. 5.

The backing provided by the jaw surfaces 18, 20 encircling the preform 26 prevents distortions of the sleeve caused by the pressure exerted by the machining of the preform 26, which distortions if they occurred could lead to inaccuracies in the finished liner.

It will be understood by those skilled in the art that other additional steps are typically also carried out in manufacture of cylinder liner sleeves, as for example, honing of the inside diameter.

Figure 6:
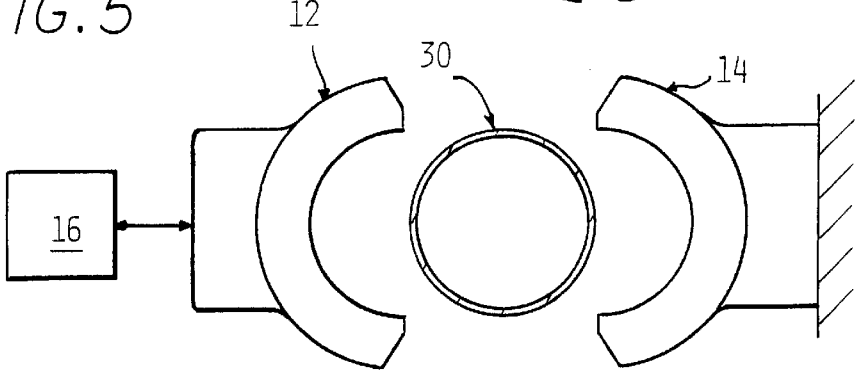
FIG. 6 is an end view of the chuck with the movable jaw retracted to allow removal of the thin walled finished cylinder liner sleeve.

FIG. 6 shows the retraction of the movable jaw 12 to release the finished thin walled cylinder liner sleeve 30.

The wall thereof is shown having an exaggerated thickness for clarity.

Accordingly, very thin walled precision sized cylinder liner sleeves can be economically produced by this method, using the special two jawed chuck described. Other encircling chucks could be used.

Further, instead of providing a predetermined slight difference in diameter of the jaw engagement surfaces, a pressure sensor (not shown) could be used to create a desired holding force by a controlled advance of the movable jaw, a greater difference in diameter allowing a range of travel. This would insure that adequate but not excessive gripping forces are developed as where tolerance errors in the preform outside diameter exist.

I claim:

1. A method of precision machining a thin walled sleeve from a heavy walled tubular preform having an inside diameter and outside diameter, comprising the steps of:

first machining the outside diameter of said preform to a finished size;

chucking the finished machined outside diameter of the preform in a chuck having engagement surfaces substantially completely encircling and engaging said outside diameter along a total length of said preform to be machined internally while slightly compressing the same sufficiently to secure said preform therein;

machining the inside diameter of said preform to a finished size to form said thin walled sleeve while providing a backing of said preform by said complete engagement of said chucking surfaces to prevent distortions thereof by forces generated during said machining step; and, removing said finish machined thin walled sleeve from said chuck.

2. The method according to claim 1 wherein in said chucking step, a two jawed chuck is utilized, each jaw formed with a semicircular engagement surface, said semicircular surface of each of said jaws together comprising said engagement surfaces, said jaws moved together to chuck said preform therein, said semicircular surfaces together forming a circle of a diameter slightly smaller than said finished outside surface diameter of said preform.

3. The method according to claim 2 wherein said jaws are formed with surfaces moved into abutment as said semicircular surfaces form a circle to thereby limit the compression of said preform.

4. A method according to claim 3 wherein said circle is sized to be about 0.0002 inches smaller than said finished outside surface diameter of said preform.

5. A method of manufacturing an engine cylinder liner sleeve comprising the steps of:

forming a cast iron tubular preform having an inside and outside diameter;

machining the outside diameter to a finished size for fitting to an engine cylinder bore;

chucking the outside diameter substantially completely along a total length of said preform to be internally machined with substantially completely encircling engagement surfaces; and finish machining the inside diameter of said preform by said complete engagement of sad chucking surfaces to prevent distortions thereof by forces generated during said machining step to produce a thin walled liner sleeve.

6. The method according to claim 5 wherein said encircling engagement surfaces create a predetermined degree of compression of said preform.

7. The method according to claim 5 wherein after said step of finish machining said inside diameter of said preform, a wall thickness of said engine cylinder liner sleeve only a few thousandths of an inch results.

\* \* \* \* \*